P. TEN. EYCK.
Wagon-Brake.
No. 13,108.
Patented June 19, 1855.
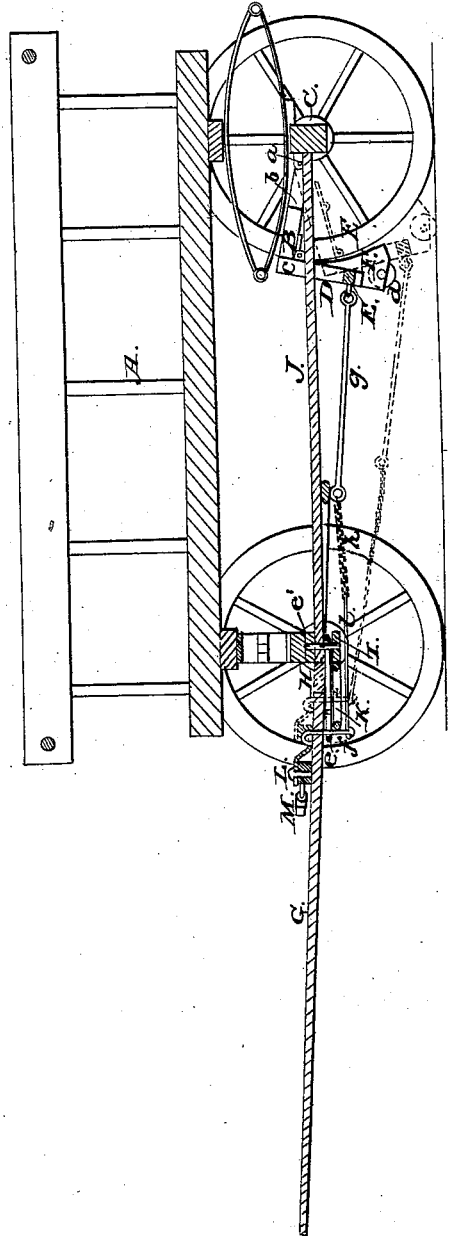
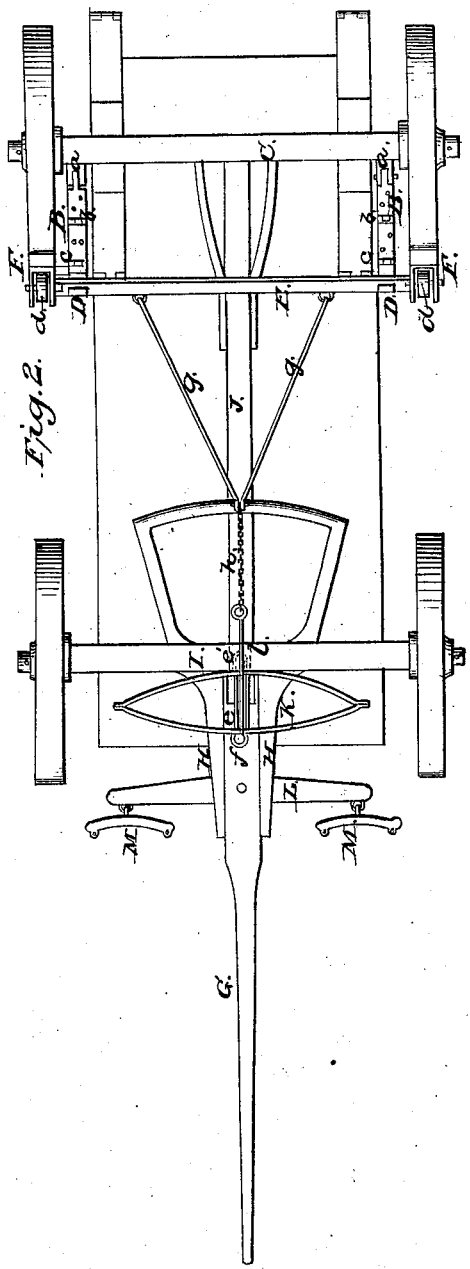

UNITED STATES PATENT OFFICE.

PETER TEN EYCK, OF NEW YORK, N. Y.

SELF-ACTING BRAKE FOR VEHICLES.

Specification of Letters Patent No. 13,108, dated June 19, 1855.

*To all whom it may concern:*

Be it known that I, PETER TEN EYCK, of the city, county, and State of New York, have invented a new and Improved Self-Acting Brake, for Vehicles; and I do hereby declare that the following is a full, clear, and exact description of the same, reference being had to the annexed drawings, making a part of this specification, in which—

Figure 1, is a longitudinal vertical section of my improvement applied to a vehicle. Fig. 2, is an inverted plan of ditto.

Similar letters of reference indicate corresponding parts in the two figures.

The nature of my invention consists in attaching to the back axle of a vehicle by means of levers or jointed arms two shoes, which are also connected to the tongue or shafts of the vehicle, arranged as will be hereafter fully shown and described, whereby said shoes, when the speed of the horses are checked, will drop or fall by their own gravity and bind between the peripheries of the back wheels and the surface of the ground or pavement, and stop the vehicle. The shoes being elevated free from the wheels when the vehicle is started or the draft or pull brought upon the pole or shafts.

To enable others skilled in the art to fully understand and construct my invention, I will proceed to describe it.

A, represents a vehicle of any sort, as the improvement is applicable to all, and B, B, represent two levers or arms which are attached by joints $a$, to the back axle C, an arm or lever being near each end of the axle C, as shown in Fig. 2. These arms or levers have each a joint or hinge, $b$, at about their centers, and the ends of the arms or levers are connected by joints or hinges, $c$, to pendent arms D, D, to the lower ends of which a bar E, is connected, having a shoe F, attached to each end.

The faces of the shoes F, F, may be curved corresponding with the curvature of the wheels, and the lower ends of the shoes may be provided each, with a friction roller, $d$, as shown in Fig. 1.

G, represents the draft pole which is not as usual attached rigidly to the front axle, but is allowed to slide a certain distance between the "hounds" H, H, the end of the pole having a link, $e$, attached to it, which link passes horizontally through the front axle represented by I, and a pin or bolt, $e'$, passes vertically through the center of the front axle and link, said pin or bolt also attaching the front end of the perch J, to the front axle. The inner edges of the hounds H, H, are beveled to a sharp or miter edge, and the edges of the pole that fit between the hounds are recessed to receive the beveled edges of the hounds thus forming guides for the longitudinal play of the pole. The link, $e$, is of a sufficient length to allow the pole to slide or play the requisite distance.

K, represents an elliptic spring, one side of which bears against the front axle I, and the other side against a pin or bolt, $f$, which connects the link, $e$, to the pole.

To the shoe bar E, there are connected two rods, $g$, $g$, the outer ends of which are attached to a chain, $h$. The opposite end of this chain is connected to a link, $l$, which is attached to the outer side of the spring K. To the back part of the pole G, there are attached the usual bar L, and whiffle trees M.

The operation of the brake will be readily seen. The horses, or team are attached to the vehicle in the usual manner. As the vehicle is drawn along the spring K, will keep the bar E, and shoes E, F, in an elevated position, or free from the back wheels of the vehicle, as shown in black Fig. 1, the springs being made sufficiently strong to effect this, without taking into consideration the "pull" upon the pole G. When however the speed of the horse are checked, the back action upon the pole caused by the momentum of the vehicle, will overcome the resistance of the spring K, and the spring K, will be compressed, the pole G, sliding back in or between the hounds H, H, and the bar E, and shoes F, F, will drop or fall by their own gravity, the chain, $h$, and rods, $g$, $g$, of course being made slack by the back action or movement of the pole G, and the shoes F, F, will bind between the peripheries of the back wheels, and the surface of the ground or pavement and will consequently stop the vehicle. The friction rollers, $d$, $d$, are merely attached to the lower ends of the shoes to prevent the stoppages from being too abrupt or sudden. The shoes are kept in proper place at all times by the rods, $g$, $g$, and chain, $h$, or when the shoes are elevated and depressed as will readily be seen, for they prevent the shoes when depressed from passing too far underneath the wheels, as well as serving to keep them elevated when the vehicle is moving.

The above invention is extremely simple, and may be economically applied to all vehicles drawn by one or more horses, including city railroad cars.

The brake is perfectly selfacting, requiring no additional care on the part of the driver.

I do not claim a brake formed by placing shoes between the wheels, and the surface of the ground, irrespective of the peculiar arrangement or connection herein shown between the shoes and the draft pole, or shafts, for they have been previously used for rail road brakes, but

What I claim as new and desire to secure by Letters Patent, is,

The employment of the shoes F, F, attached to the back axle C, of the vehicle, by the jointed arms or levers B, D, where said shoes are connected to a sliding draft pole G, by rods, $g$, $g$, and chain, $h$, said pole G, having a spring K, attached to it. The above parts being arranged substantially as herein shown and for the purpose as set forth.

PETER TEN EYCK.

Witnesses:
   John W. Jackson,
   Wm. Tusch.